US005640987A

United States Patent [19]
Sturman

[11] Patent Number: 5,640,987
[45] Date of Patent: Jun. 24, 1997

[54] DIGITAL TWO, THREE, AND FOUR WAY SOLENOID CONTROL VALVES

[76] Inventor: Oded E. Sturman, 3973 Santa Monica Ct., Newbury Park, Calif. 91320

[21] Appl. No.: 223,440

[22] Filed: Apr. 5, 1994

[51] Int. Cl.⁶ .......................... F15B 13/044; F16K 31/06
[52] U.S. Cl. ..................... 137/1; 137/625.65; 251/129.1
[58] Field of Search ............................ 137/625.65, 1; 251/129.1

[56] References Cited

U.S. PATENT DOCUMENTS

| | | |
|---|---|---|
| 1,700,228 | 1/1929 | Kendall . |
| 2,912,010 | 11/1959 | Evans . |
| 2,930,404 | 3/1960 | Kowalski . |
| 2,934,090 | 4/1960 | Kenann et al. . |
| 2,946,513 | 7/1960 | Sampietro . |
| 2,967,545 | 1/1961 | Schmidt . |
| 3,368,791 | 2/1968 | Wells . |
| 3,683,239 | 8/1972 | Sturman . |
| 3,718,159 | 2/1973 | Tennis . |
| 3,743,898 | 7/1973 | Sturman . |
| 3,821,967 | 7/1974 | Sturman et al. . |
| 3,995,652 | 12/1976 | Belart et al. . |
| 4,046,112 | 9/1977 | Deckard . |
| 4,108,419 | 8/1978 | Sturman et al. . |
| 4,114,647 | 9/1978 | Sturman et al. . |
| 4,182,492 | 1/1980 | Albert et al. . |
| 4,219,154 | 8/1980 | Luscomb . |
| 4,275,693 | 6/1981 | Leckie . |
| 4,279,385 | 7/1981 | Straubel et al. . |
| 4,392,612 | 7/1983 | Deckard et al. . |
| 4,405,082 | 9/1983 | Walter et al. . |
| 4,409,638 | 10/1983 | Sturman et al. . |
| 4,482,094 | 11/1984 | Knape . |
| 4,550,875 | 11/1985 | Teerman et al. . |
| 4,605,166 | 8/1986 | Kelly . |
| 4,625,918 | 12/1986 | Funada et al. . |
| 4,741,478 | 5/1988 | Teerman et al. . |
| 4,770,346 | 9/1988 | Kaczynski . |
| 4,821,773 | 4/1989 | Herion et al. . |
| 4,979,674 | 12/1990 | Taira et al. . |
| 5,036,885 | 8/1991 | Miura . |
| 5,108,070 | 4/1992 | Tominaga . |
| 5,133,386 | 7/1992 | Magee . |
| 5,143,291 | 9/1992 | Grinsteiner . |
| 5,251,659 | 10/1993 | Sturman et al. . |

FOREIGN PATENT DOCUMENTS

| | | |
|---|---|---|
| 264710 | 1/1950 | Germany . |
| 2209206 | 8/1973 | Germany .................. 251/129.1 |
| 4-341653 | 4/1992 | Japan . |
| 349165 | 5/1931 | United Kingdom . |
| 892121 | 3/1962 | United Kingdom . |

*Primary Examiner*—Gerald A. Michalsky
*Attorney, Agent, or Firm*—Blakely Sokoloff Taylor & Zafman

[57] ABSTRACT

A control valve that has a pair of solenoids which move a spool between first and second positions. The spool and housing are constructed from a magnetic steel which maintains the spool in either the first or second position. The spool is located within a valve chamber of a housing which has at least two fluid ports. The valve controls the flow of fluid between the ports in accordance with the position of the spool. The valve can be constructed to be either a two-way, three-way or a four-way valve. The spool has an inner chamber which is in fluid communication with both the valve chamber and the drain port of the valve. The inner chamber insures that the ends of the spool are balanced and that a hydraulic pressure does not build up in the valve chamber.

46 Claims, 5 Drawing Sheets

… …

DIGITAL TWO, THREE, AND FOUR WAY SOLENOID CONTROL VALVES

BACKGROUND OF THE INVENTION

1. Field of the Invention

The present invention relates to digitally controlled solenoid actuator fluid control valves.

2. Description of Related Art

Control valves are typically used to control the flow of fluid within an hydraulic or pneumatic system. Some conventional fluid control valves contain a solenoid(s) which moves a spool within the inner chamber of a valve housing. The fluid is routed between various housing ports in accordance with the position of the spool. Conventional control valves include two-way, three-way and four-way valves. A two-way valve contains two ports and provides fluid communication between the two ports when in an open position and blocks the flow of fluid between the ports when in a closed position.

A three-way valve allows fluid communication between a first port and a common port when the spool is in one position and allows fluid communication between a second port and the common port when the spool is in a second position. By way of example, the first port can be connected to the outlet of a pump, the second port can be connected to a drain and the common port can be coupled to a cylinder chamber of an actuator. When the solenoid of the control valve is energized, the spool allows fluid to flow from the pump to the actuator, causing an output shaft of the actuator to move into an extended position. When the solenoid is de-energized, a return spring moves the spool back to the original position so that the cylinder chamber of the actuator is in fluid communication with the drain. The actuator may also have a return spring which moves the output shaft back to the original position and pushes the fluid within the cylinder chamber to the drain through the control valve. The control valve can thus be used to extend and retract the output shaft of an actuator.

A four-way valve couples a pair of fluid ports with a second pair of fluid ports, in accordance with the position of the spool. Four-way valves are particularly useful in controlling actuators which do not have spring return output shafts. For example, the supply port of a four-way valve may be connected to a pressurized fluid supply, the return port may be connected to drain, a first cylinder port may be coupled to a first cylinder chamber of the actuator and a second cylinder port may be coupled to a second opposite cylinder chamber of the actuator. When the spool is in one position, the spool couples the first cylinder chamber to the supply port and the second cylinder chamber to drain. When the spool is moved into the second position, the spool couples the first cylinder chamber to drain and the second cylinder chamber to the supply port. Like the three-way valve, a four way valve can both extend and retract the output shaft of an actuator.

Conventional solenoid actuated control valves are analog in the sense that power must be continuously supplied to energize the solenoid. The continuous supply of power generates heat which can degrade the performance and life of the coil wires and the valve. Analog valves are typically constructed to compensate for the heat by increasing the size and mass of the valve. Bulky heavy control valves are undesirable for applications such as the control of fuel in an automobile, where size and weight are critical. It is desirable to have a control valve that does not require power to maintain the spool of the valve in either position. It is also desirable to provide a solenoid control valve, which is reliable, relatively inexpensive to produce, has a quick response time and can be operated without a continuous supply of power.

SUMMARY OF THE INVENTION

The present invention is a control valve that has a pair of solenoids which move a spool between first and second positions. The spool and housing are constructed from a magnetic steel which maintain the spool in either the first or second position. The spool is located within a valve chamber of a housing which has at least two fluid ports. The valve controls the flow of fluid between the ports in accordance with the position of the spool. The valve can be constructed to be either a two-way, a three-way or a four-way valve.

In operation, one of the solenoids is energized to move the spool into a new position. Power to the solenoid is then terminated. The hysteresis of the housing and spool maintain the spool in position. The spool is moved back to the original position by energizing the opposite solenoid and again terminating power.

The spool has an inner chamber which is in fluid communication with both the valve chamber and the drain port of the valve. The inner chamber insures that the ends of the spool are balanced and that a hydraulic pressure does not build up in the valve chamber. The balanced spool reduces the power required by the solenoids and improves the response time of the valve.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 6b is an end view of the spool of FIG. 6a;

DETAILED DESCRIPTION OF THE INVENTION

Figure 1:
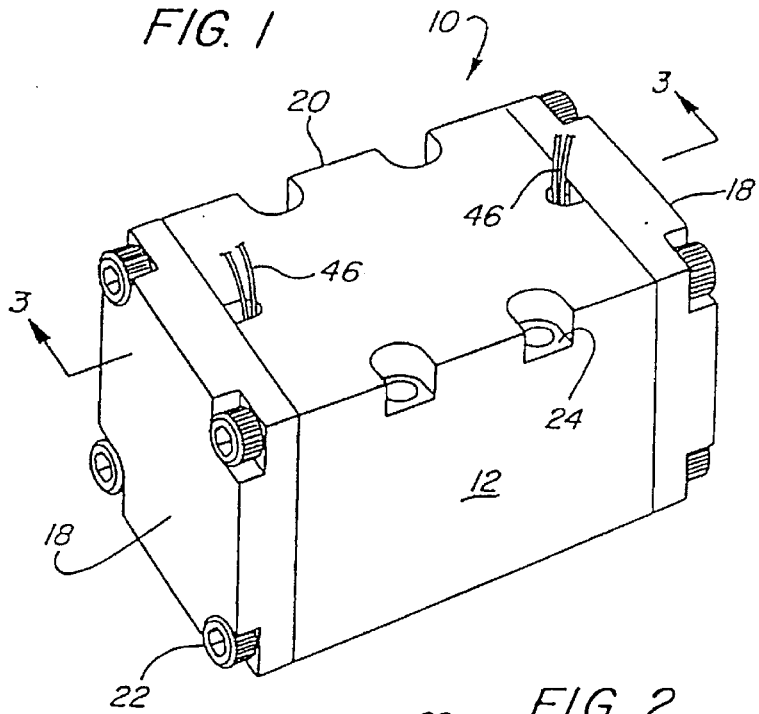
FIG. 1 is a perspective view of a control valve of the present invention.
Figure 2:
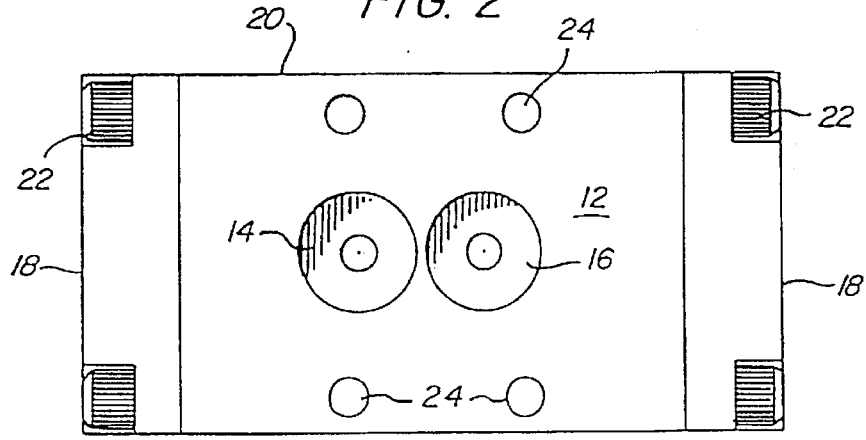
FIG. 2 is a bottom view of the valve of FIG. 1.
Figure 3:
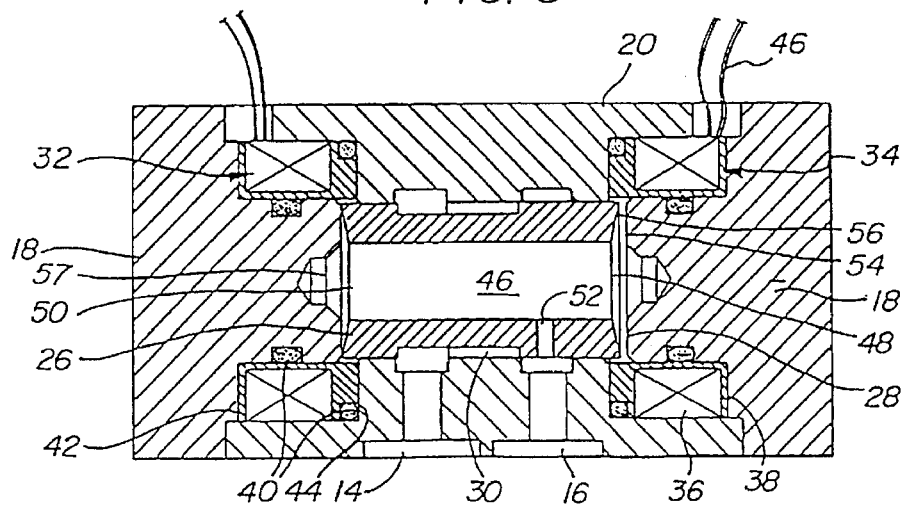
FIG. 3 is a cross-sectional view of the control valve of FIG. 1 showing a spool in a first position.

Referring to the drawings more particular by reference numbers, FIGS. 1–3 show a control valve 10 of the present invention. The valve 10 has a housing 12 which contains a first port 14 and a second port 16. The housing 12 is preferably assembled from two end pieces 18 and a center block 20. The end pieces 18 are attached to the center block 20 by bolts 22. The center block 20 may have either threaded or clearance holes 24 that allow the valve 10 to be mounted to another member such as a manifold or an injector valve.

Figure 4:
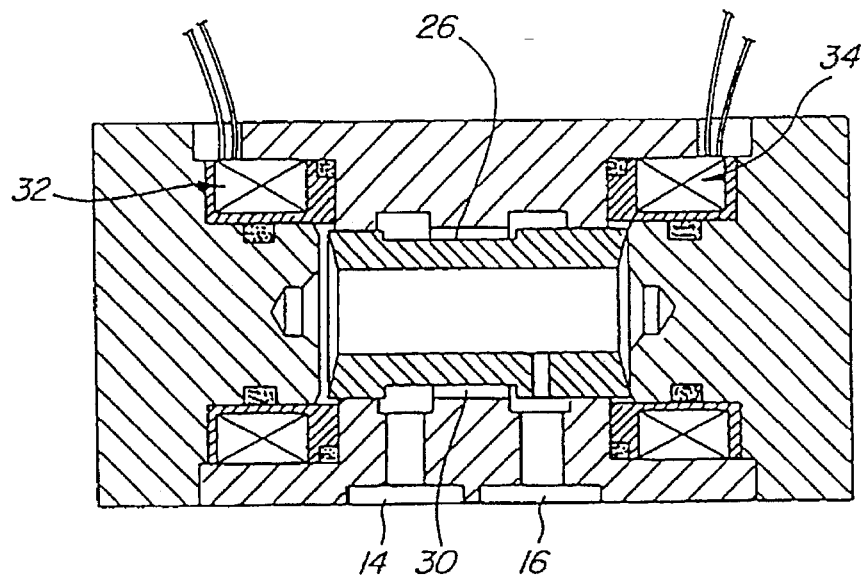
FIG. 4 is a view similar to FIG. 3, showing the spool in a second position.

The valve 10 has a spool 26 located within a valve chamber 28 of the housing 12. The spool 26 can move between a first position shown in FIG. 3 and a second position shown in FIG. 4. The spool 26 has an annular groove 30 that is adjacent to the ports 14 and 16. As shown in FIG. 3, when the spool 26 is in the first position, the spool 26 prevents fluid from flowing between the ports 14 and 16. As shown in FIG. 4, when the spool 26 is in the second position, the annular groove 30 provides fluid communication between the first port 14 and the second port 16.

The valve 10 has a first solenoid 32 which moves the spool 26 into the first position and a second solenoid 34 that moves the spool 26 into the second position. Each solenoid 32 and 34 has a coil 36 wrapped around a bobbin 38. The valve chamber 28 is sealed by O-rings 40 located in grooves 42 and 44 of the housing 12 and bobbins 38, respectively.

The solenoids 32 and 34 may be connected to an external electrical controller (not shown) by wires 46. The controller provides current to the solenoids 32 and 34 to control the operation of the valve. To open the valve 10 and allow fluid communication between the ports 14 and 16, the controller provides a current to the second solenoid 34. Power to the second solenoid 34 is terminated once the spool 26 has reached the second position. The termination of power can be controlled by supplying the current for a predetermined time interval, the time interval being long enough to insure that the spool 26 has reached the new position, or by actually sensing when the spool has reached the new position and terminating power, accordingly. The valve can be closed again by energizing the first solenoid 32 and terminating power to the solenoid 32 when the spool 26 has reached the first position.

The housing 12 and spool 26 are constructed from a magnetic material such as a 4140 hardened steel. The housing 12 preferably has a Rockwell hardness of 55C and the spool 26 has a hardness of 50C. The spool 26 is preferably softer than the housing 12 to prevent galling of the material. The hysteresis of the housing 12 and spool 26 maintain the spool 26 in position even after power to the solenoid is terminated. The valve of the present invention can thus be operated in a digital manner, wherein a pulse is provided to a solenoid to move the spool to either position.

The spool 26 has an inner chamber 46 that is in fluid communication with the valve chamber 28 through openings 48 and 50. The spool 26 also has a passage 52 that provides fluid communication between the inner chamber 46 and the second port 16. Fluid may accumulate in the ends of the valve chamber 28 by leaking between the spool 26 and the center block 20. The openings 48 and 50 insure that any fluid pressure within the valve chamber 28 is applied equally to both ends of the spool 26. The equal fluid pressure balances the spool 26 so that the solenoids do not have to overcome the fluid pressure within the valve chamber 28 when moving the spool 26 from one position to another position. The balanced spool provides a control valve that has relatively low power requirements and consequently generates less heat than conventional control valves. The balanced spool also increases the response time of the valve.

The second port 16 is typically coupled to a drain, wherein the fluid within the valve chamber 28 is at the same pressure as the drain. In many applications the drain pressure is essentially atmospheric. If the second port 16 is coupled to a system which has a relatively high back pressure, the valve may have a separate third drain port (not shown) for draining the valve chamber 28.

Figure 5:
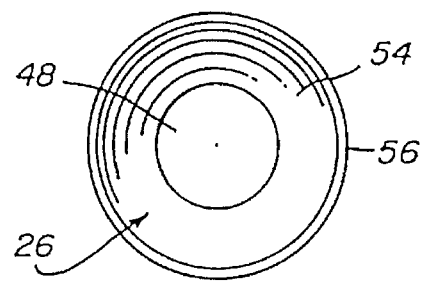
FIG. 5 is a cross-sectional side view showing the end of the valve.

As shown in FIG. 5, each end of the spool 26 may have a concave surface 54 that extends from an outer rim 56 to an opening. The concave surface 54 creates a cavity which reduces the hydraulic pressure effects when the spool 26 moves to a new position. The cavity acts as a reservoir that fills and prevents the creation of a fluid pressure which may counteract the pull of the solenoid. Referring to FIG. 3, the end pieces 18 may also have cavities 57 which reduce the hydrostatic forces on the spool 26.

Figure 6A:
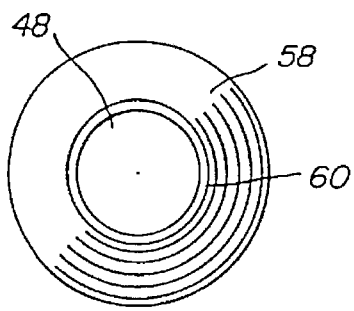
FIG. 6a is a cross-sectional view of an alternate spool embodiment.
Figure 6B:
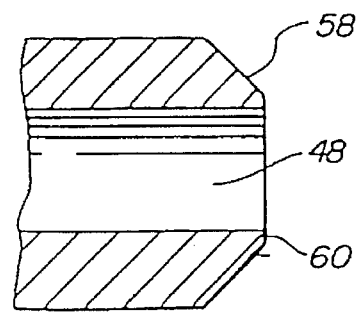

The outer rim 56 of the spool 26 makes contact with the end pieces 18 of the housing 12. The rim 56 should have a sufficient area to insure enough residual magnetism to maintain the spool in position. FIGS. 6a–b show an alternate embodiment, wherein each spool end has a tapered surface 58 that extends to an inner rim 60. The embodiment of FIG. 6 also prevents the build-up of hydraulic pressure between the end of the spool and the end pieces 18, when the spool is moving from one position to another position.

Figure 7:
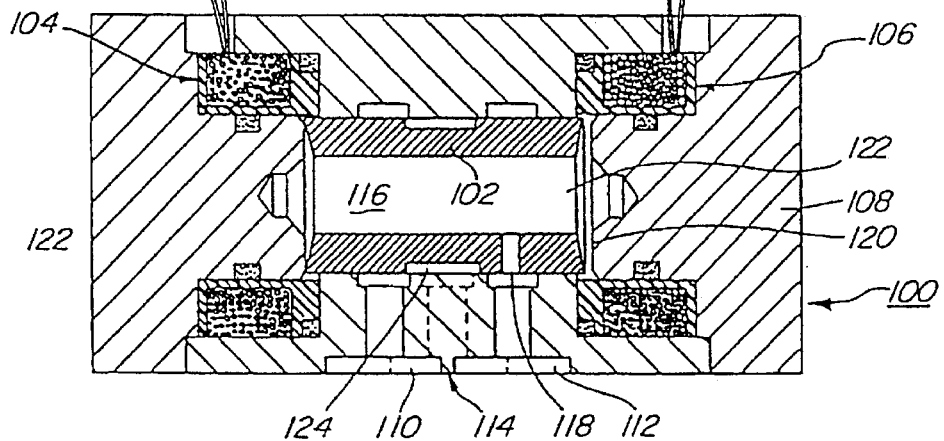
FIG. 7 is a cross-sectional view of a spool in a first position of a three-way valve.
Figure 8:
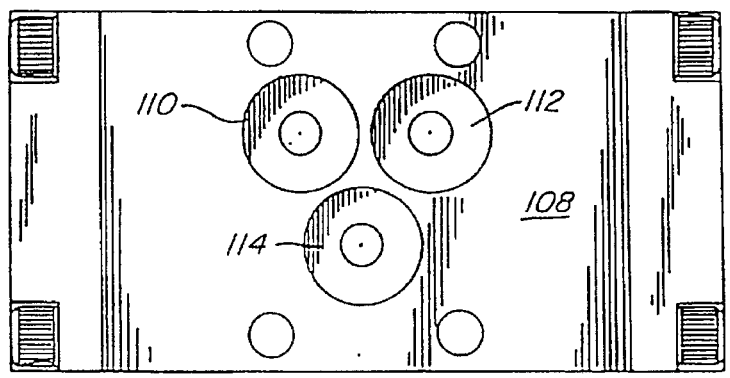
FIG. 8 is a bottom view showing the ports of the three-way valve of FIG. 7.
Figure 9:
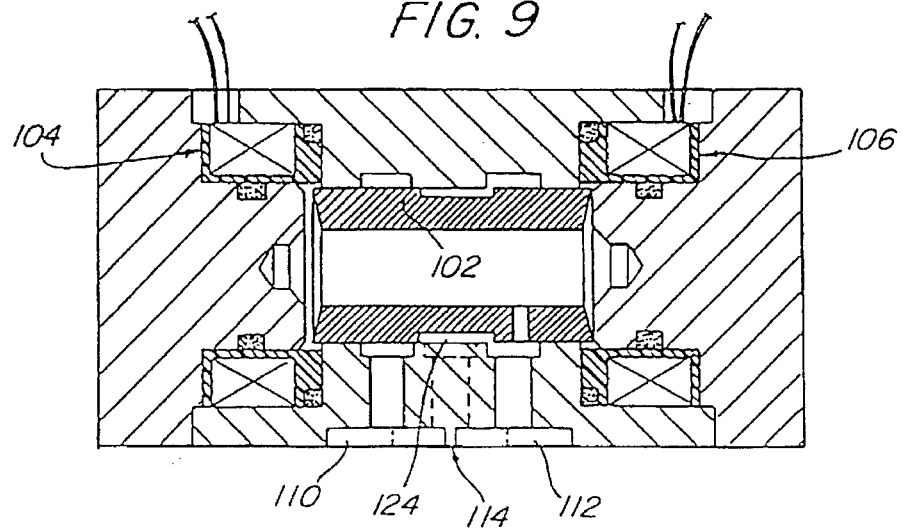
FIG. 9 is a cross-sectional view similar to FIG. 7 showing the spool in a second position.

FIGS. 7–9 show the present invention incorporated into a three-way control valve 100. The three-way valve includes a spool 102 which is moved between first and second positions by first 104 and second 106 solenoids. The valve housing 108 has a first port 110, a second port 112 and a third port 114. The spool 102 is balanced by an inner chamber 116 which is in fluid communication with the second port 112 through passage 118, and with the valve chamber 120 of the housing 108 through spool openings 122.

When the spool 102 is in the first position shown in FIG. 7, the valve 100 provides fluid communication between the first port 110 and the third port 114 through an annular groove 124, and prevents fluid communication between the second port 112 and the third port 114. When the second solenoid 106 moves the spool 102 to the second position shown in FIG. 9, the annular groove 124 allows fluid communication between the second port 112 and the third port 114 and prevents fluid communication between the first port 110 and the third port 114. The first port 110 is typically connected to a pressurized supply of fluid (pump), the second port 112 is typically connected to a drain, and the third port 114 can be coupled to a working element such as the cylinder chamber of an actuator (not shown). When the valve 100 is opened (spool in the first position), fluid can flow from the pressurized supply to the cylinder chamber through the first 110 and third 114 ports. When the valve is closed (spool in the second position), the fluid within the cylinder chamber of the actuator can drain through the third 114 and second 112 ports. The housing and spool are constructed from a magnetic material so that the spool is maintained in position by the residual magnetism of the material. The valve can be switched in a digital manner by providing a pulse to one of the solenoids as described above.

Figure 13:
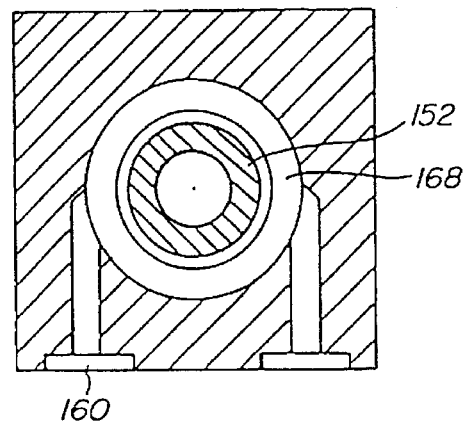
FIG. 13 is a cross-sectional view taken at line 13—13 of FIG. 10.
Figure 14:
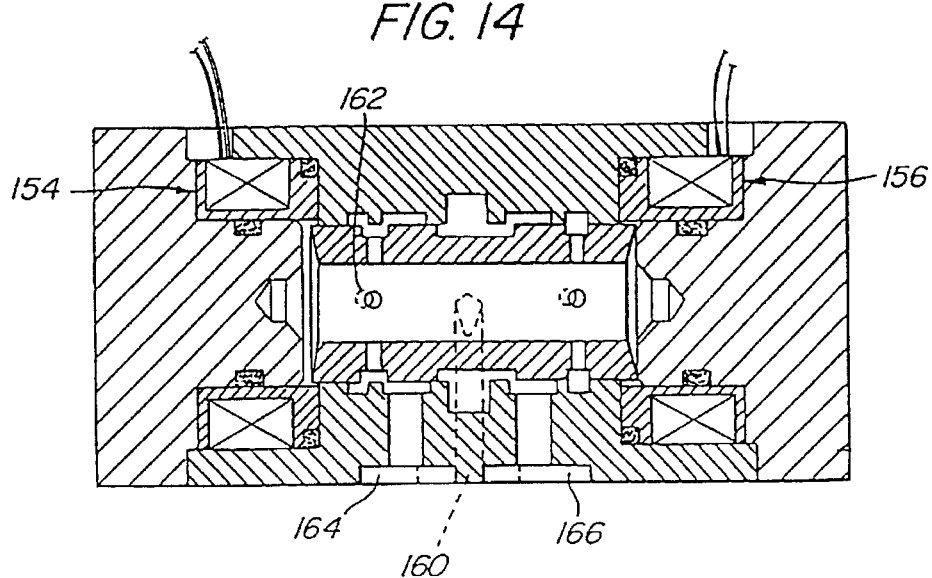
FIG. 14 is a cross-sectional view similar to FIG. 10 showing the spool in a second position.

FIGS. 10–14 show the present invention incorporated into a four-way control valve 150. The four-way valve includes a spool 152 which is moved between first and second positions by first 154 and second 156 solenoids. The valve housing 158 has a first port 160, a second port 162, a third port 164 and a fourth port 166. As shown in FIG. 13, the first port 160 is in fluid communication with an annular groove 168 of the spool 152. The spool 162 is balanced by an inner chamber 170 which is in fluid communication with the second port 162 through passages 172, and with the valve chamber 174 of the housing 176 through spool openings 178.

Figure 10:
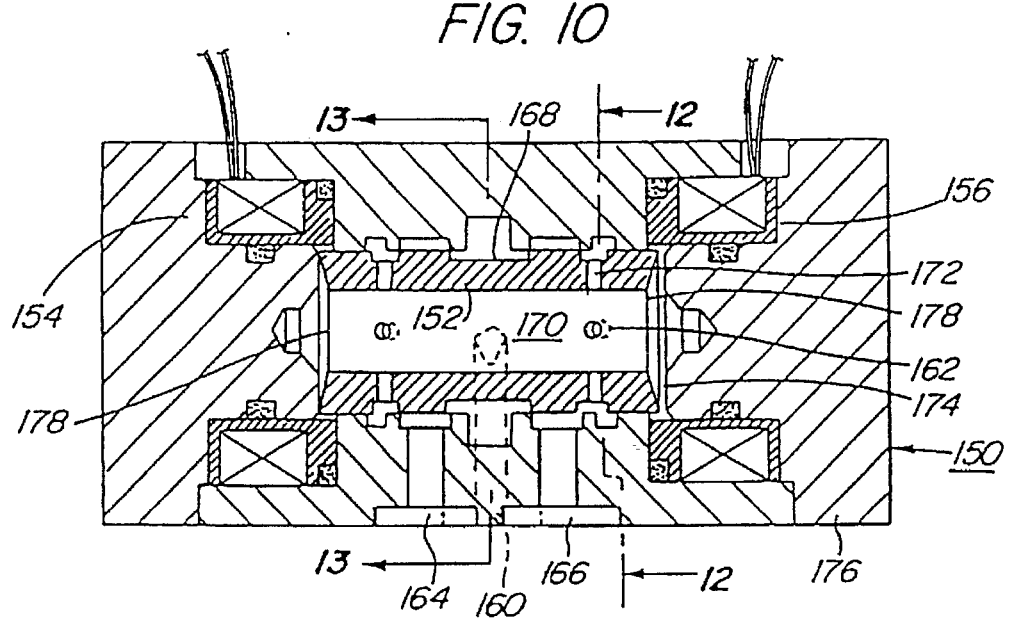
FIG. 10 is a cross-sectional view of a spool in a first position of a four-way valve.
Figure 11:
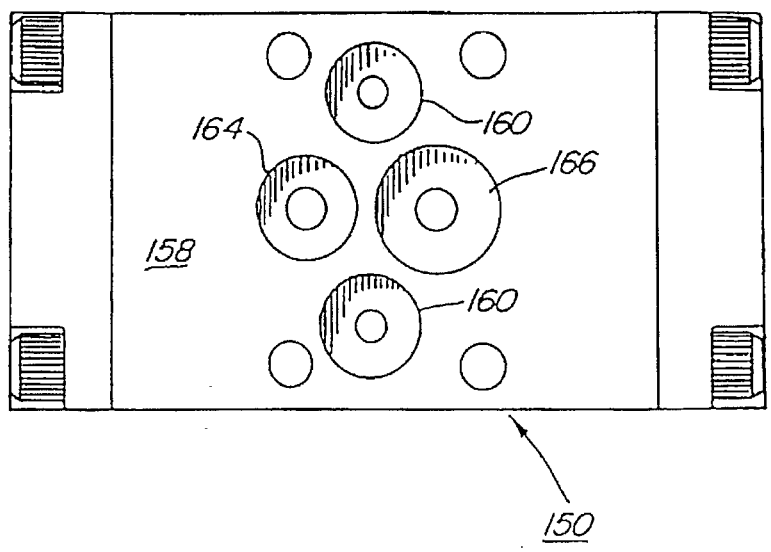
FIG. 11 is a bottom view showing the ports of the four-way valve of FIG. 10.
Figure 12:
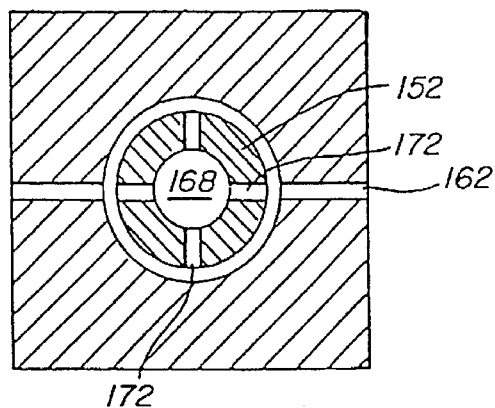
FIG. 12 is a cross-sectional view taken at line 12—12 of FIG. 10.

When the spool 152 is in the first position shown in FIG. 10, the first port 160 is in fluid communication with the third port 164 and the second port 162 is in fluid communication with the fourth port 166. When the spool 152 is pulled by the second solenoid into the second position shown in FIG. 14, the first port 160 is in fluid communication with the fourth port 166 and the second port 162 is in fluid communication with the third port 164.

By way of example, the first port 160 may be connected to a pressurized fluid supply, the second port 162 connected to a drain, the third port 164 coupled to a first cylinder chamber of an actuator (not shown) and the fourth port 166 may be connected to an opposite second cylinder chamber of the actuator. When the spool is in the first position, fluid may flow into the first cylinder chamber from the supply through ports 160 and 164, and from the second cylinder chamber into the drain through ports 162 and 166. Movement of the spool 152 to the second position will reverse flow, wherein fluid flows from the supply into the second cylinder chamber through ports 160 and 166 and flows out of the first chamber and into drain through ports 162 and 164. The four-may valve operates in the digital manner described above, wherein power to the solenoids is terminated after the spool has reached the new position.

What is thus provided are two-way, three-way and four-way valves that contained balance spools and are operated in a digital manner, thereby decreasing the power requirements and increasing the response time of the valve.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A control valve, comprising:

a housing with a first port and a second port, said housing further having a valve chamber;

a spool that can move between a first position and a second position within said valve chamber, said spool preventing fluid communication between said first port and said second port when in said first position and allowing fluid communication between said first port and said second port when said spool is in said second position, said spool having a pair of tapered surfaces located at opposite ends of said spool; and, solenoid means for moving said spool between said first and second positions, wherein a residual magnetism of said spool and said housing maintain the position of said spool.

2. The control valve as recited in claim 1, further comprising a third port in said housing, wherein said third port is in fluid communication with said first port when said spool is in said first position and said third port is in fluid communication with said second port when said spool is in said second position.

3. The control valve as recited in claim 2, further comprising a fourth port in said housing, wherein said first port is in fluid communication with said third port and said second port is in fluid communication with said fourth port when said spool is in said first position, and said first port is in fluid communication with said fourth port and said second port is in fluid communication with said third port when said spool is in said second position.

4. The control valve as recited in claim 1, wherein said housing and said spool are constructed from a steel which has a residual magnetism that will maintain said spool in said first and second positions without power being supplied to said solenoid means.

5. The control valve as recited in claim 1, wherein each spool end has an outer contact rim and a concave surface that extends from said outer contact rim to said spool opening.

6. The control valve as recited in claim 1, wherein each spool end has an inner contact rim adjacent to said spool opening and a tapered surface that extends from said inner contact rim to an outer surface of said spool.

7. The control valve as recited in claim 1, wherein said solenoid means includes a first solenoid that moves said spool to said first position and a second solenoid that moves said spool to said second position.

8. The control valve as recited in claim 1, wherein said spool has an inner chamber that is in fluid communication with said second port.

9. A control valve, comprising:

a housing with a first port, a second port and a third port, said housing further having a valve chamber;

a spool that can move between a first position and a second position within said valve chamber, wherein said third port is in fluid communication with said first port when said spool is in said first position and said third port is in fluid communication with said second port when said spool is in said second position, said spool having a pair of tapered surfaces located at opposite ends of said spool; and, solenoid means for moving said spool between said first and second positions, wherein a residual magnetism of said spool and said housing maintain the position of said spool.

10. The control valve as recited in claim 9, wherein said solenoid means includes a first solenoid that moves said spool to said first position and a second solenoid that moves said spool to said second position.

11. The control valve as recited in claim 9, wherein said spool has an inner chamber that is in fluid communication with said second port.

12. The control valve as recited in claim 9, wherein said housing and said spool are constructed from a steel which has a residual magnetism that will maintain said spool in said first and second positions without power being supplied to said solenoid means.

13. The control valve as recited in claim 9, wherein each spool end has an outer contact rim and a concave surface that extends from said outer contact rim to said spool opening.

14. The control valve as recited in claim 9, wherein each spool end has an inner contact rim adjacent to said spool opening and a tapered surface that extends from said inner contact rim to an outer surface of said spool.

15. A control valve, comprising:

a housing with a first port, a second port, a third port and a fourth port, said housing further having a valve chamber;

a spool that can move between a first position and a second position within said valve chamber, wherein said first port is in fluid communication with said third port and said second port is in fluid communication with said fourth port when said spool is in said first position, and said first port is in fluid communication with said fourth port and said second port is in fluid communication with said third port when said spool is in said second position, said spool having a pair of tapered surfaces located at opposite ends of said spool; and, solenoid means for moving said spool between said first and second positions, wherein a residual magnetism of said spool and said housing maintain the position of said spool.

16. The control valve as recited in claim 15, wherein said solenoid means includes a first solenoid that moves said spool to said first position and a second solenoid that moves said spool to said second position.

17. The control valve as recited in claim 15, wherein said spool has an inner chamber that is in fluid communication with said second port.

18. The control valve as recited in claim 15, wherein said housing and said spool are constructed from a steel which has a residual magnetism that will maintain said spool in said first and second positions without power being supplied to said solenoid means.

19. The control valve as recited in claim 15, wherein each spool end has an outer contact rim and a concave surface that extends from said outer contact rim to said spool opening.

20. The control valve as recited in claim 15, wherein each spool end has an inner contact rim adjacent to said spool opening and a tapered surface that extends from said inner contact rim to an outer surface of said spool.

21. A method for directing fluid flow, comprising the steps of:
   a) energizing a first solenoid which moves a spool to a first position wherein said spool prevents fluid communication between a first port and a second port of a housing, said spool having a pair of tapered surfaces located at opposite ends of said spool;
   b) de-energizing said first solenoid wherein a residual magnetism of said housing and said spool maintain said spool in said first position;
   c) energizing a second solenoid which moves said spool to a second position that allows fluid communication between said first port and said second port; and,
   d) de-energizing said second solenoid wherein a residual magnetism of said housing and said spool maintain said spool in said second position.

22. A method for directing fluid flow, comprising the steps of:
   a) energizing a first solenoid which moves a spool to a first position wherein said spool allows fluid communication between a first port and a second port of a housing, said spool having a pair of tapered surfaces located at opposite ends of said spool;
   b) de-energizing said first solenoid wherein a residual magnetism of said housing and said spool maintain said spool in said first position;
   c) energizing a second solenoid which moves said spool to a second position that allows fluid communication between said first port and a third port; and,
   d) de-energizing said second solenoid wherein a residual magnetism of said housing and said spool maintain said spool in said second position.

23. A method for directing fluid flow, comprising the steps of:
   a) energizing a first solenoid which moves a spool to a first position wherein said spool allows fluid communication between a first port and a third port, and between a second port and a fourth port of a housing, said spool having a pair of tapered surfaces located at opposite ends of said spool;
   b) de-energizing said first solenoid wherein a residual magnetism of said housing and said spool maintain said spool in said first position;
   c) energizing a second solenoid which moves said spool to a second position that allows fluid communication between said first port and said fourth port, and between said second port and said third port; and,
   d) de-energizing said second solenoid wherein a residual magnetism of said housing and said spool maintain said spool in said second position.

24. A control valve, comprising:
   a housing with a first port and a second port, said housing further having a valve chamber located between a pair of opposing housing bearing surfaces;
   a steel spool that can move between a first position and a second position within said valve chamber, said spool preventing fluid communication between said first port and said second port when in said first position and allowing fluid communication between said first port and said second port when said spool is in said second position, said spool having a pair of opposite ends which engage said housing bearing surfaces; and,
   solenoid means for moving said spool between said first and second positions, wherein a residual magnetism of said housing bearing surfaces and said ends of said spool maintain the position of said spool.

25. The control valve as recited in claim 24, further comprising a third port in said housing, wherein said third port is in fluid communication with said first port when said spool is in said first position and said third port is in fluid communication with said second port when said spool is in said second position.

26. The control valve as recited in claim 25, further comprising a fourth port in said housing, wherein said first port is in fluid communication with said third port and said second port is in fluid communication with said fourth port when said spool is in said first position, and said first port is in fluid communication with said fourth port and said second port is in fluid communication with said third port when said spool is in said second position.

27. The control valve as recited in claim 24, wherein said housing and said spool are constructed from a steel which has a hystersis that will maintain said spool in said first and second positions without power being supplied to said solenoid means.

28. The control valve as recited in claim 24, wherein each spool end has an outer contact rim and a concave surface that extends from said outer contact rim to said spool opening.

29. The control valve as recited in claim 24, wherein each spool end has an inner contact rim adjacent to said spool opening and a tapered surface that extends from said inner contact rim to an outer surface of said spool.

30. The control valve as recited in claim 24, wherein said solenoid means includes a first solenoid that moves said spool to said first position and a second solenoid that moves said spool to said second position.

31. The control valve as recited in claim 24, wherein said spool has an inner chamber that is in fluid communication with said second port.

32. A control valve, comprising:
   a housing with a first port, a second port and a third port, said housing further having a valve chamber located between a pair of opposing housing bearing surfaces;
   a steel spool that can move between a first position and a second position within said valve chamber, wherein said third port is in fluid communication with said first port when said spool is in said first position and said third port is in fluid communication with said second port when said spool is in said second position, said spool having a pair of opposite ends which engage said housing bearing surfaces; and, solenoid means for moving said spool between said first and second positions, wherein a residual magnetism of said housing bearing surfaces and said ends of said spool maintain the position of said spool.

33. The control valve as recited in claim 32, wherein said solenoid means includes a first solenoid that moves said spool to said first position and a second solenoid that moves said spool to said second position.

34. The control valve as recited in claim 32, wherein said spool has an inner chamber that is in fluid communication with said second port.

35. The control valve as recited in claim 32, wherein said housing and said spool are constructed from a steel which has a hystersis that will maintain said spool in said first and second positions without power being supplied to said solenoid means.

36. The control valve as recited in claim 32, wherein each spool end has an outer contact rim and a concave surface that extends from said outer contact rim to said spool opening.

37. The control valve as recited in claim 32, wherein each spool end has an inner contact rim adjacent to said spool opening and a tapered surface that extends from said inner contact rim to an outer surface of said spool.

38. A control valve, comprising:

a housing with a first port, a second port, a third port and a fourth port, said housing further having a valve chamber located between a pair of opposing housing bearing surfaces;

a steel spool that can move between a first position and a second position within said valve chamber, wherein said first port is in fluid communication with said third port and said second port is in fluid communication with said fourth port when said spool is in said first position, and said first port is in fluid communication with said fourth port and said second port is in fluid communication with said third port when said spool is in said second position, said spool having a pair of opposite ends which engage said housing bearing surface; and, solenoid means for moving said spool between said first and second positions, wherein a residual magnetism of said housing bearing surfaces and said ends of said spool maintain the position of said spool.

39. The control valve as recited in claim 38, wherein said solenoid means includes a first solenoid that moves said spool to said first position and a second solenoid that moves said spool to said second position.

40. The control valve as recited in claim 38, wherein said spool has an inner chamber that is in fluid communication with said second port.

41. The control valve as recited in claim 38, wherein said housing and said spool are constructed from a steel which has a hysteresis that will maintain said spool in said first and second positions without power being supplied to said solenoid means.

42. The control valve as recited in claim 38, wherein each spool end has an outer contact rim and a concave surface that extends from said outer contact rim to said spool opening.

43. The control valve as recited in claim 38, wherein each spool end has an inner contact rim adjacent to said spool opening and a tapered surface that extends from said inner contact rim to an outer surface of said spool.

44. A method for directing fluid flow, comprising the steps of:

a) energizing a first solenoid which moves a steel spool to a first position wherein said spool prevents fluid communication between a first port and a second port of a housing, said spool having a pair of opposite ends that engage a pair of opposing housing bearing surfaces;

b) de-energizing said first solenoid wherein a residual magnetism of said housing bearing surfaces and said spool ends maintain said spool in said first position;

c) energizing a second solenoid which moves said spool to a second position that allows fluid communication between said first port and said second port; and, d) de-energizing said second solenoid wherein a residual magnetism of said housing bearing surfaces and said spool ends maintain said spool in said second position.

45. A method for directing fluid flow, comprising the steps of:

a) energizing a first solenoid which moves a steel spool to a first position wherein said spool allows fluid communication between a first port and a second port of a housing, said spool having a pair of opposite ends that engage a pair of opposing housing bearing surfaces;

b) de-energizing said first solenoid wherein a residual magnetism of said housing bearing surfaces and said spool ends maintain said spool in said first position;

c) energizing a second solenoid which moves said spool to a second position that allows fluid communication between said first port and a third port; and, d) de-energizing said second solenoid wherein a residual magnetism of said housing bearing surfaces and said spool ends maintain said spool in said second position.

46. A method for directing fluid flow, comprising the steps of:

a) energizing a first solenoid which moves a steel spool to a first position wherein said spool allows fluid communication between a first port and a third port, and between a second port and a fourth port of a housing, said spool having a pair of opposite ends that engage a pair of opposing housing bearing surfaces;

b) de-energizing said first solenoid wherein a residual magnetism of said housing bearing surfaces and said spool ends maintain said spool in said first position;

c) energizing a second solenoid which moves said spool to a second position that allows fluid communication between said first port and said fourth port, and between said second port and said third port; and, d) de-energizing said second solenoid wherein a residual magnetism of said housing bearing surfaces and said spool ends maintain said spool in said second position.

* * * * *